US 12,311,865 B1

(12) United States Patent
Han et al.

(10) Patent No.: US 12,311,865 B1
(45) Date of Patent: May 27, 2025

(54) SYSTEM AND METHOD FOR INFLATABLE RESTRAINT FOR A RIDE VEHICLE

(71) Applicant: Universal City Studios LLC, Universal City, CA (US)

(72) Inventors: Ji Hyun Han, Winter Park, FL (US); Daniel Matthew Freedman, Orlando, FL (US); Zach Morgan, Orlando, FL (US); Christine Sorrentino, Orlando, FL (US); Jeffrey A. Bardt, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/641,048

(22) Filed: Apr. 19, 2024

Related U.S. Application Data

(60) Provisional application No. 63/558,404, filed on Feb. 27, 2024.

(51) Int. Cl.
  *B60R 21/23*   (2006.01)
  *B60R 21/00*   (2006.01)
  *B60R 21/02*   (2006.01)

(52) U.S. Cl.
  CPC ...... *B60R 21/23* (2013.01); *B60R 2021/0053* (2013.01); *B60R 2021/022* (2013.01)

(58) Field of Classification Search
  CPC ............ B60R 21/23; B60R 2021/0053; B60R 2021/022
  See application file for complete search history.

(56) References Cited

U.S. PATENT DOCUMENTS

| 6,142,511 | A | 11/2000 | Lewis |
| 6,217,059 | B1 * | 4/2001 | Brown .................... B60R 21/16 280/730.2 |
| 7,204,559 | B2 | 4/2007 | Berra |
| 7,677,671 | B2 | 3/2010 | Steininger et al. |

(Continued)

FOREIGN PATENT DOCUMENTS

| DE | 102015216945 A1 * | 3/2017 | ............. B60N 2/914 |
| DE | 102019108592 A1 * | 10/2020 | |

(Continued)

OTHER PUBLICATIONS

"1962 Amphicar , We Go for a Swim with 'Dave the Wave,'" YouTube, May 30, 2012, www.youtube.com/watch?app=desktop &v=yKrlN4IW7D0.

(Continued)

*Primary Examiner* — Faye M Fleming
(74) *Attorney, Agent, or Firm* — Fletcher Yoder P.C.

(57) ABSTRACT

A restraint system for a ride vehicle includes a clamp restraint having a first restraint portion and a second restraint portion configured to transition between a released configuration and a secured configuration. The clamp restraint is configured to receive at least one passenger leg between the first restraint portion and the second restraint portion in the released configuration. The restraint system also includes one or more inflatable bladders of the first restraint portion, the second restraint portion, or both configured to inflate to engage the at least one passenger leg in the secured configuration to facilitate restraint of the passenger within the ride vehicle.

20 Claims, 6 Drawing Sheets

(56) References Cited

U.S. PATENT DOCUMENTS

| | | | |
|---|---|---|---|
| 9,139,114 | B2 | 9/2015 | Meister et al. |
| 9,827,876 | B2 * | 11/2017 | Madaras ................. B60R 21/04 |
| 10,898,816 | B2 | 1/2021 | Vance et al. |
| 11,117,539 | B2 * | 9/2021 | Masuda ................. B60N 3/066 |
| 11,358,558 | B2 | 6/2022 | Fischer et al. |
| 11,390,232 | B2 * | 7/2022 | Fischer ................. B60R 21/239 |
| 11,505,154 | B2 * | 11/2022 | Lee ....................... B60R 21/207 |
| 11,535,192 | B2 | 12/2022 | Malatek et al. |
| 11,731,539 | B2 * | 8/2023 | Ohno ................. B60N 2/6009 |
| | | | 297/485 |

FOREIGN PATENT DOCUMENTS

| | | | |
|---|---|---|---|
| DE | 102020108388 | A1 * | 9/2021 |
| DE | 102022121001 | A1 * | 2/2024 |

OTHER PUBLICATIONS

"Closer Look at Avatar Flight of Passage Ride Vehicles in Pandora at Animal Kingdom," YouTube, May 2, 2017, www.youtube.com/watch?app=desktop&v=B2UKeyzGUE4.

Mike. "Photo Tour, Review: Tron Lightcycle Power Run at Shanghai Disneyland." BlogMickey.Com—Disney World News, Photos, and Info, Apr. 3, 2018, blogmickey.com/2018/04/photo-tour-review-tron-lightcycle-power-run-at-shanghai-disneyland/.

"Search Results Product." Kitchen and Bathroom Fixtures—Faucets, Sinks, Toilets, and Accessories, www.americanstandard-us.com/search-results-product?q=walk+in+bath+. Accessed Apr. 19, 2024.

"Walk-in Tubs—Bathtubs." The Home Depot, www.homedepot.com/b/Bath-Bathtubs-Walk-in-Bathtubs/N-5yc1vZbz9m. Accessed Apr. 19, 2024.

\* cited by examiner

SYSTEM AND METHOD FOR INFLATABLE RESTRAINT FOR A RIDE VEHICLE

CROSS-REFERENCE TO RELATED APPLICATION

This application claims priority to and the benefit of U.S. Provisional Application No. 63/558,404, entitled "SYSTEM AND METHOD FOR INFLATABLE RESTRAINT FOR A RIDE VEHICLE" and filed on Feb. 27, 2024, which is incorporated by reference herein in its entirety for all purposes

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Restraint systems used for ride vehicles are currently sized for passengers who have an average body weight. When passengers with body sizes that significantly deviate from the average body weight attempt to fit inside these restraint systems, such passengers may find that they do not fit inside the ride vehicle having the restraint system or that the restraint system does not fully secure them in the ride vehicle.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a restraint system for a ride vehicle includes a clamp restraint having a first restraint portion and a second restraint portion configured to transition between a released configuration and a secured configuration. The clamp restraint is configured to receive at least one passenger leg between the first restraint portion and the second restraint portion in the released configuration. The restraint system also includes one or more inflatable bladders of the first restraint portion, the second restraint portion, or both configured to inflate to engage the at least one passenger leg in the secured configuration to facilitate restraint of the passenger within the ride vehicle.

In an embodiment, a restraint system for a ride vehicle includes a passenger support coupled to the ride vehicle. The restraint system also includes a lateral side portion of the passenger support having a bladder system. The restraint system also includes one or more sensors configured to detect a parameter indicative of passenger engagement with the bladder system and configured to provide data indicative of the parameter. The restraint system also includes an inflation system configured to control inflation of the bladder system to establish a level of passenger engagement with the bladder system to facilitate securement of a passenger within the passenger support. The restraint system also includes a controller having a processor, a memory, and instructions stored on the memory and executable by the processor to control the inflation system to control inflation of the bladder system based on the data.

In an embodiment, a method includes receiving, via a processor, a first signal from a first sensor indicative of a location of a distal end portion of a passenger leg relative to a bottom side of a ride vehicle. The method also includes determining, via the processor, an estimated location of the distal end portion of the leg based on the received first signal. The method also includes controlling, via the processor, a compressor to selectively inflate at least one bladder of a plurality of bladders based on the estimated location. The at least one bladder is disposed above the estimated location relative to the bottom side.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
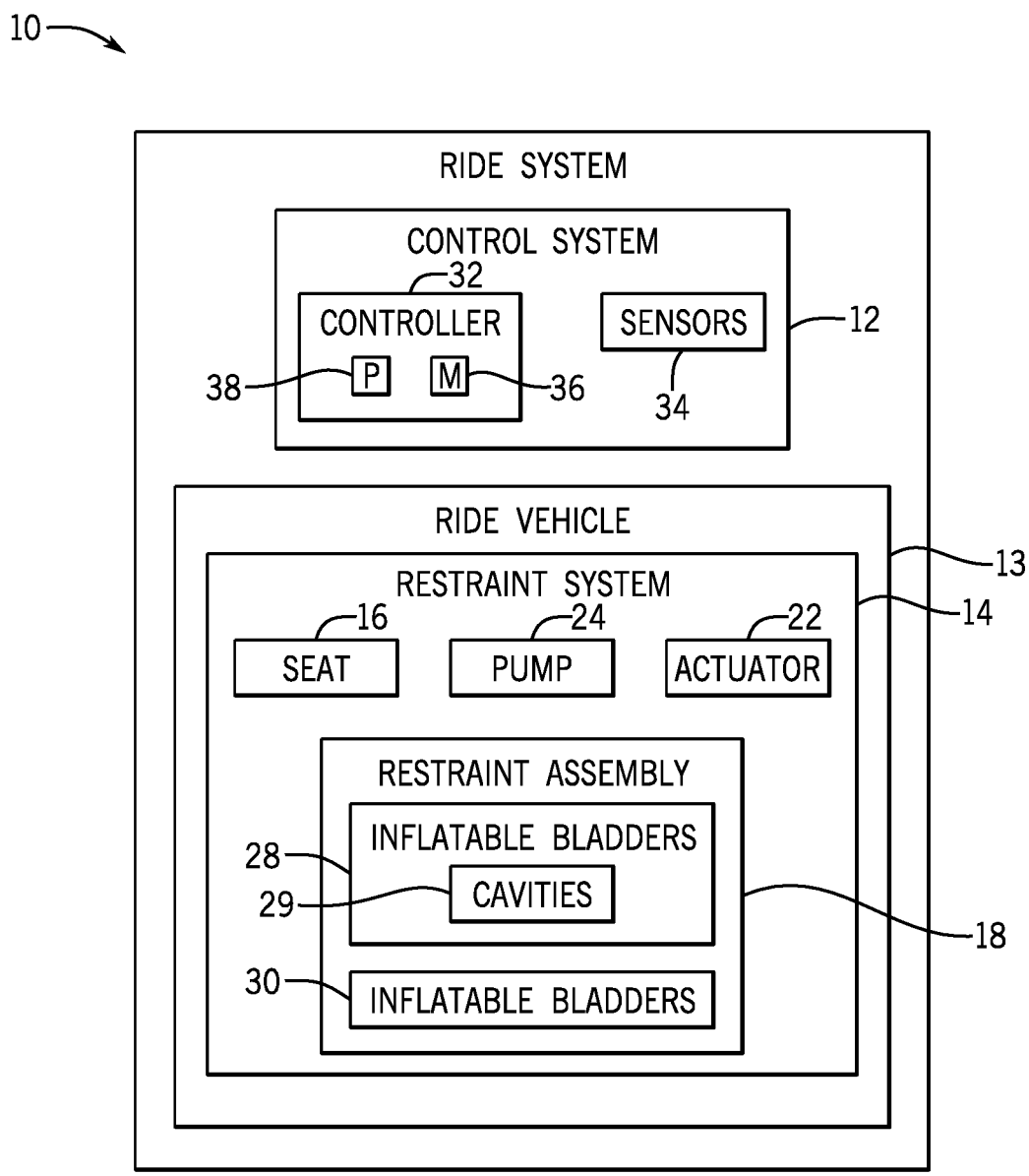
FIG. 1 is a block diagram of a ride system for an entertainment venue, in accordance with an aspect of the present disclosure.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1 percent of a target, within 1 percent of a target, within 5 percent of a target, within 10 percent of a target, within 25 percent of a target, and so on). Moreover, it should be understood that any exact values, numbers, measurements, and so on, provided herein, are contemplated to include approximations (e.g., within a margin of suitable or contemplatable error) of the exact values, numbers, measurements, and so on).

The present disclosure is directed to a restraint system that may be used in any of a variety of environments and/or with any of a variety of vehicles. For example, the restraint systems described herein may be utilized in ride vehicles used for amusement ride systems. In an embodiment of the present disclosure, a restraint system includes a bladder system having one or more bladders, an inflation system configured to inflate the one or more bladders, and a control system having a controller and one or more sensors, wherein the control system is configured to control the inflation system. The one or more bladders of the bladder system may be configured to engage at least one leg of a passenger of a ride vehicle or, in an embodiment, may be configured to engage a midsection (e.g., hip region, waist region, etc.) of the passenger. For example, bladders positioned opposite and facing one another may receive a passenger's leg between them and inflate into engagement about the passenger's leg.

In an embodiment, the restraint system includes a clamp restraint comprising a first restraint portion and a second restraint portion. The first restraint portion is configured to move from a released configuration and toward the second restraint portion into a secured configuration. The clamp restraint is configured to receive at least one passenger leg between the first restraint portion and the second restraint portion in the released configuration, which may also be referred to as an open or accessible configuration. The restraint system also includes one or more inflatable bladders of the first restraint portion, the second restraint portion, or both configured to inflate to engage the at least one passenger leg in the secured configuration to facilitate restraint of the passenger within the ride vehicle. The secured configuration may also be referred to as a closed or restricted configuration.

Primary Restraint System Using Leg Restraints

With the preceding in mind, FIG. 1 is a block diagram of a ride system 10 (e.g., for an entertainment venue). The ride system 10 includes a control system 12 and a ride vehicle 13 having a restraint system 14. The restraint system 14 includes a seat 16, a restraint assembly 18 (e.g., clamp restraint), an actuator 22, and a pump 24. In the illustrated embodiment, the restraint system 14 is disposed in the ride vehicle 13 of the ride system 10. For example, the ride vehicle 13 may include a ride vehicle configured to traverse a track (e.g., rollercoasters), a ride vehicle configured to traverse land (e.g., driven ground vehicles, autonomous ground vehicles, etc.), a ride vehicle configured to traverse water (e.g., a raft, a boat, etc.), a ride vehicle configured to traverse air (e.g., a parachute, a glider, etc.), or any combination thereof. In the illustrated embodiment, the restraint assembly 18 includes one or more inflatable bladders 28 having one or more cavities 29, and one or more restraints 30 (e.g., restraint portions). It should be noted that the ride system 10 may include one or more ride vehicles 26, and the restraint system 14 may include one or more restraint assemblies 18.

In the illustrated embodiment, the control system 12 includes a controller 32 configured to receive sensor data from sensor(s) 34 (e.g., position sensor, pressure sensor, proximity sensor, etc.), and to control operation of the restraint system 14 (e.g., based on the sensor data). The controller 32 includes a memory 36 and a processor 38 (e.g., processing circuitry, a microprocessor). Moreover, the processor 38 may include multiple microprocessors, one or more "general-purpose" microprocessors, one or more special-purpose microprocessors, and/or one or more application specific integrated circuits (ASICS), or some combination thereof. For example, the processor 38 may include one or more reduced instruction set computer (RISC) or complex instruction set computer (CISC) processors. The memory 36 may include a volatile memory, such as random access memory (RAM), and/or a nonvolatile memory, such as read-only memory (ROM). The memory 36 may store a variety of information and may be used for various purposes. For example, the memory 36 may store processor-executable instructions (e.g., firmware or software) for the processor 38 to execute, such as instructions for controlling various componentry of the ride system 10. The memory 36 and/or the processor 38, or an additional memory and/or processor, may be located in any suitable portion of the ride system 10.

In an embodiment, the actuator 22 may be coupled to the one or more restraints 30 and may be configured to move the one or more restraints 30 toward a passenger in the ride vehicle 13. For example, as discussed herein, the actuator 22 may be configured to move the one or more restraints 30 toward a leg of the passenger that is properly seated in the ride vehicle 13. In other words, the actuator 22 may be configured to move the one or more restraints 30 toward an area of the ride vehicle in which a rider's leg or legs should be positioned. At least one restraint 30 of the one or more restraints 30 may include the one or more inflatable bladders 28. As discussed herein, the one or more inflatable bladders 28 may be configured to inflate via the pump 24 causing an influx of a fluid (e.g., air, water) into the one or more cavities 29 of the one or more inflatable bladders 28. The restraint system 14 is configured to at least partially restrain the passenger in the ride vehicle 13 based on an inflation of the one or more bladders 28.

Figure 2:
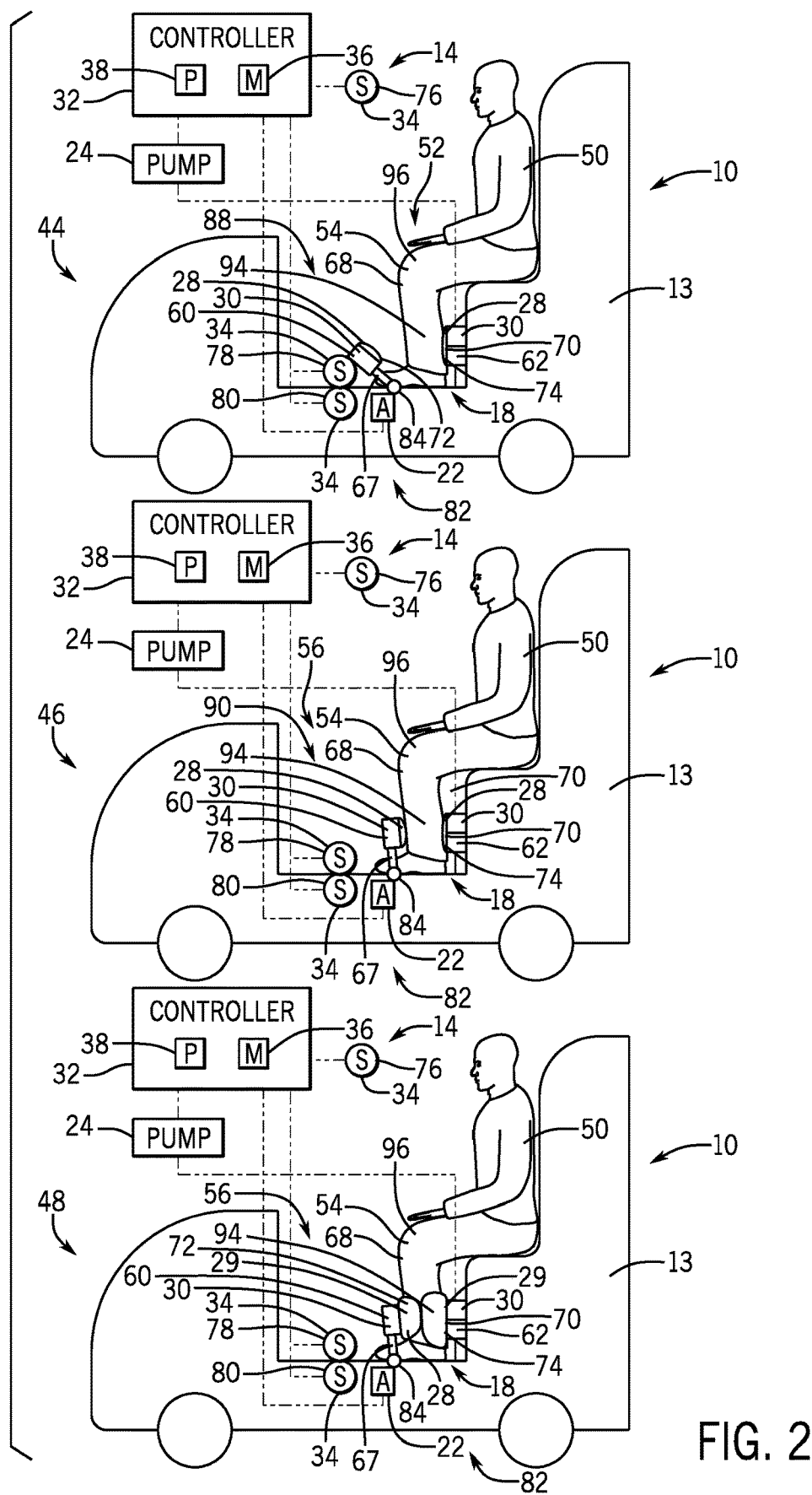
FIG. 2 is a series of side views of the ride system of FIG. 1, employing a restraint system having a pivoting restraint assembly, in accordance with an aspect of the present disclosure.

FIG. 2 is a series of side views of the ride system 10 of FIG. 1 employing a restraint system 14 having a pivoting restraint assembly 18. A first side view 44, a second side view 46, and a third side view 48 combine to illustrate transitioning from receiving a passenger 50 into the restraint assembly 18 to securing the passenger 50 in the restraint assembly 18. The first side view 44 shows the restraint assembly 18 in a released configuration 52 and receiving at least one leg 54 of the passenger 50. The second side view 46 shows the restraint assembly 18 in a secured configuration 56 and disposed about the at least one leg 54 of the passenger 50. The third side view 48 shows the restraint assembly 18 in the secured configuration 56 and with the one or more inflatable bladders 28 inflated to establish and/or increase engagement of the restraint assembly 18 with the passenger 50.

In the illustrated embodiment, the restraint system 14 includes a restraint assembly 18 having restraints 30. Specifically, the illustrated embodiment includes two restraints 30, a first restraint 60 and a second restraint 62. In the illustrated embodiment, the first restraint 60 is a front restraint disposed in front of the at least one leg 54 of the passenger 50, and the second restraint 62 is a rear restraint disposed behind the at least one leg 54 of the passenger 50. As shown, the first restraint 60 (also referred to as first restraint portion) is disposed in front of at least one leg 54 of a passenger 50 seated in the seat 16 of the ride vehicle 13, and the second restraint 62 (also referred to as a second restraint portion) is disposed behind the at least one leg 54 of the passenger 50. In the illustrated embodiment, the first restraint 60 includes a restraint arm 67 (e.g., restraint guard, restraint post, etc.) coupled to the ride vehicle 13 via a pivot 84, though it should be noted that the first restraint 60 may include other actuator types (e.g., a ratchet, a slide, a scroll). The first restraint 60 is configured to engage a first side 68 (e.g., front side) of the at least one leg 54, and the second restraint 62 is configured to engage a second side 70 (e.g., back side) of the at least one leg 54. The first restraint 60, the second restraint 62, or both include one or more inflatable bladders 28 configured inflate to facilitate engagement with the at least one leg 54 of the passenger 50.

In an embodiment, the restraint assembly 18 is configured to transition between a released configuration 52 and a secured configuration 56. While the restraint assembly 18 is in the released configuration 52, the restraint assembly 18 (e.g., clamp restraint) is configured to receive the at least one leg 54 of the passenger 50 between the first restraint 60 and the second restraint 62. The released configuration 52 may include the first restraint 60 transitioned away (e.g., rotated away) from the second restraint 62 along a movement path available to the first restraint 60. In an embodiment, the second restraint 62 may also or separately be able to transition away from the first restraint 60 along a movement path available to the second restraint 62 into the released configuration 52, which may facilitate receipt of the at least one leg 54 into the restraint assembly 18. In contrast, in the secured configuration 56, the restraint assembly 18 may facilitate engagement of one or both of the restraints 30 with the at least one leg 54 directly or upon inflation of one or both restraints 30. The one or more inflatable bladders 28 of the first restraint 60, the second restraint 62, or both are configured to inflate to facilitate restraint of the passenger 50 within the ride vehicle 13 in the secured configuration 56.

In the illustrated embodiment, the ride system 10 includes the controller 32 and sensors 34. The sensors 34 include an occupancy sensor 76 configured to detect a presence of the passenger 50, a position sensor 78 configured to measure a position (e.g., angular position) of the first restraint 60, and an engagement sensor 80 configured to measure engagement (e.g., via a pressure) of the one or more inflatable bladders 28. The ride system 10 may include the actuator 22 coupled to the first restraint 60. In the illustrated embodiment, the first restraint 60 includes a restraint arm 67 pivotally coupled to a bottom portion 82 (e.g., floor, bottom end, bottom side, etc.) of the ride vehicle 13 via a pivot 84. It may be recognized that for some ride vehicles 13 (e.g., a sit-down ride vehicle), the bottom portion 82 may include a floor of the ride vehicle 13. For other types of ride vehicles 13 (e.g., an inverted ride vehicle), the bottom portion 82 may include a bottom side of the seat 16 of the ride vehicle 13. In the illustrated embodiment, the second restraint 62 is coupled to a bottom portion 86 of the seat 16 of the ride vehicle 13. The second restraint 62 may also be pivotably coupled to the bottom portion 82 of the ride vehicle 13.

In an embodiment, the ride system 10 may be configured to, via the controller 32, determine a presence of the passenger 50 in the seat 16 of the ride vehicle 13 in response to receiving a signal from the occupancy sensor 76 indicative of the presence of the passenger 50. More specifically, this may include the occupancy sensor 76 detecting that the passenger 50 is properly seated and/or otherwise positioned. For example, the occupancy sensor 76 may include an optical sensor and/or a weight sensor that can detect proper positioning of legs, positioning of arms, and/or weight distribution of the passenger 50 in the seat 16 and surrounding space in the ride vehicle 13. Further, the ride system 10 may be configured to, via the controller 32, actuate (e.g., rotate) the first restraint 60 and/or the second restraint 62 based on detected presence and/or positioning of the passenger 50.

To facilitate proper actuation of the restraint assembly 18, the ride system 10 may be configured to, via the controller 32, receive a signal from the position sensor 78 indicative of a position (e.g., angular position) of the first restraint 60 and/or the second restraint 62. The controller 32 may then utilize the signal received from the position sensor 78 to determine the position of the first restraint 60 and/or the second restraint 62 for use in control of the restraint assembly 18. For example, the controller 32 may instruct the actuator 81 to rotate the first restraint 60 from the released configuration 52 (e.g., first angular position) toward the second restraint 62 and into a secured configuration 56 (e.g., second angular position). As shown, in the secured configuration 56, the first restraint 60 is proximate to the at least one leg 54 of the passenger 50. In accordance with present embodiments, the restraint assembly 18 may be controlled to engage with passenger 50 prior to or only after inflation of associated inflatable bladders 28. For example, the actuator 81 may be controlled to stop the rotation of the first restraint 60 in response to determining that the position of the first restraint 60 is breeching (e.g., exceeding) a threshold position (e.g., a threshold distance to a detected leg of the passenger). The threshold may be determined based on metrics associated with an inflated state of the inflatable bladders 28. For example, the threshold may operate to stop the first restraint 60 and/or the second restraint 62 within a few centimeters of a passenger leg to allow for initiation of engagement by inflation of the inflatable bladders 28.

In an embodiment, the ride system 10, via the controller 32, may be configured to control the pump 24 to inflate the one or more inflatable bladders 28 in response to the determined position of the first restraint 60 breeching the threshold position. The one or more inflatable bladders 28 may include a flexible membrane disposed about the one or more cavities 29, wherein the flexible membrane is configured to expand based on an influx of a fluid (e.g., air, water) into the one or more cavities 29. As shown, a first inflatable bladder 74 is configured to engage (e.g., contact, press against, etc.) a rear side 92 (e.g., second side) of the at least one leg 54 of the passenger 50 disposed between an ankle 94 of the at least one leg 54 and a knee 96 of the at least one leg 54. Additionally, a second inflatable bladder 72 is configured to engage the front side 68 (e.g., first side) of the at least one leg 54 when the first restraint 60 is in the secured configuration 56. In accordance with embodiments of the present disclosure, either the first inflatable bladder 74 or the second inflatable bladder 72 may be omitted. That is, a single inflatable bladder 28 may be used in conjunction with another component or surface of the restraint assembly 18 to secure the passenger 50 in the secured configuration 56.

In an embodiment, the controller 32 may be configured to receive a signal from the engagement sensor 80 indicative of a pressure of a fluid (e.g., air, water, etc.) disposed within the one or more cavities 29 of the one or more inflatable bladders 28. Specifically, the controller 32 may be configured to determine an estimated pressure of the fluid disposed within the one or more cavities 29 based on the received signal and control the pump 24 to inflate the one or more inflatable bladders 28 based on the estimated pressure. For example, controlling the pump 24 may include comparing the estimated pressure (e.g., measured pressure) to a threshold pressure, and operating the pump 24 to inflate the one or more inflatable bladders 28 in response to the estimated pressure falling below the threshold pressure. By inflating the one or more inflatable bladders 28 to a setpoint (e.g., predetermined, preset, etc.) pressure, the one or more inflatable bladders 28 may be configured to at least partially secure (e.g., restrain) the at least one leg 54 of the passenger 50. It should be noted that primary securement of the passenger 50 (e.g., the at least one leg 54) may be achieved by mechanical aspects of the restraint assembly 18 without the use of the inflatable bladders 28. However, the inflatable bladders 28 may operate to block the passenger 50 from moving within or slipping out of the restraint assembly 18. For example, other aspects of the restraint assembly 18 may directly engage the passenger 50 and then the inflatable bladders 28 may be inflated to expand into open spaces that prevent certain movement even within the restraint assembly 18 in the secured configuration 56.

Figure 3:
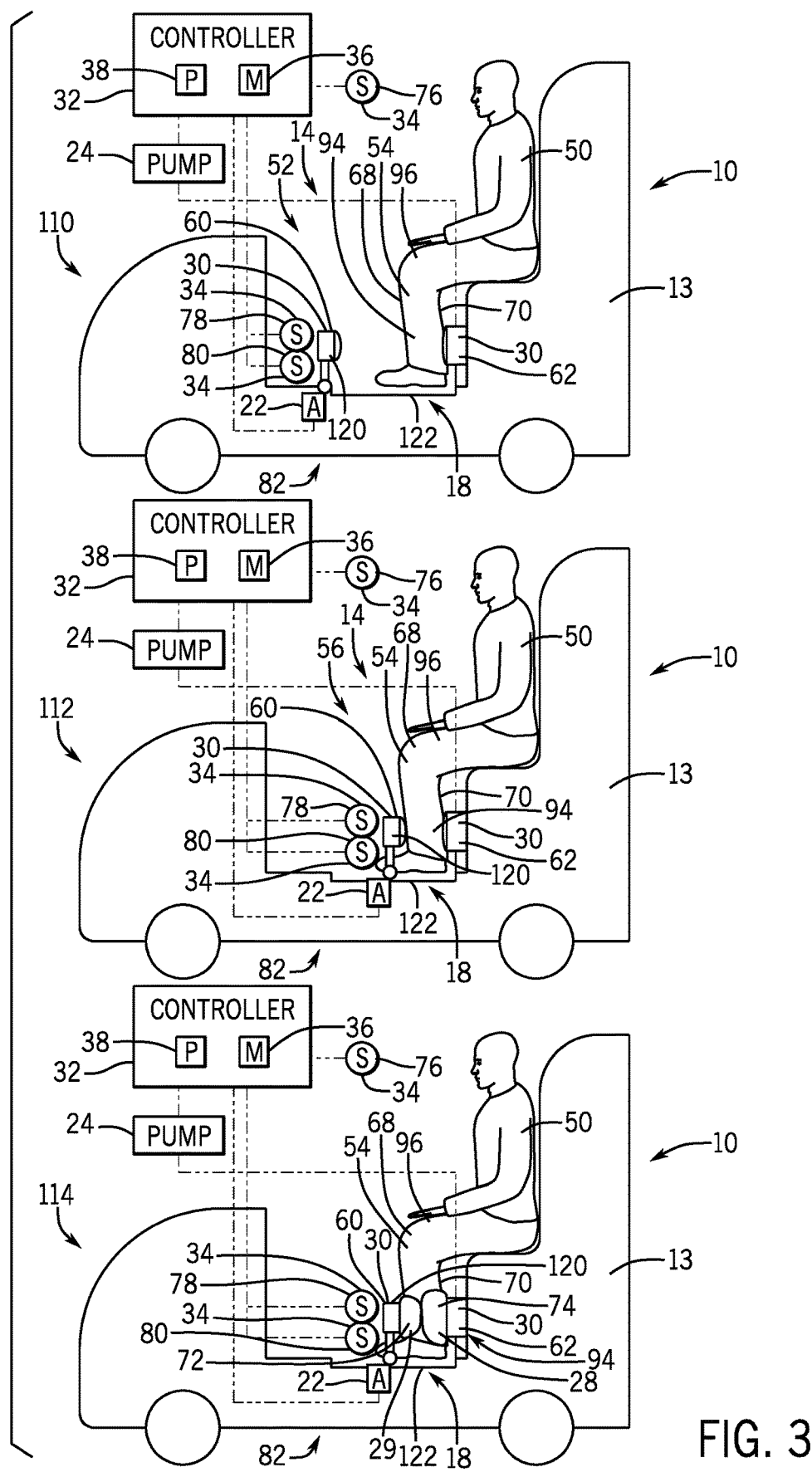
FIG. 3 is a series of side views of the ride system of FIG. 1, employing a restraint system having a sliding restraint assembly, in accordance with an aspect of the present disclosure.

FIG. 3 is a series of side views of the ride system 10 of FIG. 1, employing a restraint system 14 having a translating (e.g., sliding) restraint assembly 18. A first side view 110, a second side view 112, and a third side view 114 combine to illustrate transitioning from receiving a passenger 50 into the restraint assembly 18 to securing the passenger 50 in the restraint assembly 18. The first side view 110 shows the restraint assembly 18 in a released configuration 52 and receiving at least one leg 54 of the passenger 50. The second side view 112 shows the restraint assembly 18 in a secured configuration 56 and disposed about the at least one leg 54 of the passenger 50. The third side view 114 shows the restraint assembly 18 in the secured configuration 56 and with the one or more inflatable bladders 28 inflated to establish and/or increase engagement of the restraint assembly 18 with the passenger 50.

In the illustrated embodiment, the restraint system 14 includes a restraint assembly 18 having restraints 30. Specifically, the illustrated embodiment includes two restraints 30, a first restraint 60 and a second restraint 62. As shown, the first restraint 60 (also referred to as first restraint portion) is disposed in front of at least one leg 54 of a passenger 50 seated in the seat 16 of the ride vehicle 13, and the second restraint 62 (also referred to as a second restraint portion) is disposed behind the at least one leg 54 of the passenger 50. In the illustrated embodiment, the first restraint 60 includes a plank 120 (e.g., horizontal rail, horizontal guard) configured to translate across the bottom portion 82 of the ride vehicle 13 toward the second restraint 62. The first restraint 60 is configured to engage a first side 68 (e.g., front side) of the at least one leg 54, and the second restraint 62 is configured to engage a second side 70 (e.g., back side) of the at least one leg 54. The first restraint 60, the second restraint 62, or both include one or more inflatable bladders 28 configured inflate to facilitate engagement with the at least one leg 54 of the passenger 50.

In an embodiment, the restraint assembly 18 is configured to transition between a released configuration 52 and a secured configuration 56. While the restraint assembly 18 is in the released configuration 52, the restraint assembly 18 (e.g., clamp restraint) is configured to receive the at least one leg 54 of the passenger 50 between the first restraint 60 and the second restraint 62. The released configuration 52 may include the first restraint 60 transitioned away (e.g., translated away) from the second restraint 62 along a movement path available to the first restraint 60. In an embodiment, the second restraint 62 may also or separately be able to transition away from the first restraint 60 along a movement path available to the second restraint 62 into the released configuration 52, which may facilitate receipt of the at least one leg 54 into the restraint assembly 18. In contrast, in the secured configuration 56, the restraint assembly 18 may facilitate engagement of one or both of the restraints 30 with the at least one leg 54 directly or upon inflation of one or both restraints 30. The one or more inflatable bladders 28 of the first restraint 60, the second restraint 62, or both are configured to inflate to facilitate restraint of the passenger 50 within the ride vehicle 13 in the secured configuration 56.

In the illustrated embodiment, the ride system 10 includes the controller 32 and sensors 34. The sensors 34 include an occupancy sensor 76 configured to detect a presence of the passenger 50, a position sensor 78 configured to measure a position (e.g., translational position) of the first restraint 60, and an engagement sensor 80 configured to measure engagement (e.g., via a pressure) of the one or more inflatable bladders 28. The ride system 10 may include the actuator 22 coupled to the first restraint 60. In the illustrated embodiment, the first restraint 60 includes the plank 120 configured to translate across the bottom portion 82 of the ride vehicle 13 toward the second restraint 62 via tracks 122 disposed on the bottom portion 82. It may be recognized that for some ride vehicles 13 (e.g., a sit-down ride vehicle), the bottom portion 82 may include a floor of the ride vehicle 13. For other types of ride vehicles 13 (e.g., an inverted ride vehicle), the bottom portion 82 may include a bottom side of the seat 16 of the ride vehicle 13. In the illustrated embodiment, the second restraint 62 is coupled to a bottom portion 86 of the seat 16 of the ride vehicle 13. The second restraint 62 may also be configured to translate across the bottom portion 82 of the ride vehicle 13.

In an embodiment, the ride system 10 may be configured to, via the controller 32, determine a presence of the passenger 50 in the seat 16 of the ride vehicle 13 in response to receiving a signal from the occupancy sensor 76 indicative of the presence of the passenger 50. More specifically, this may include the occupancy sensor 76 detecting that the passenger 50 is properly seated and/or otherwise positioned. For example, the occupancy sensor 76 may include an optical sensor and/or a weight sensor that can detect proper positioning of legs, positioning of arms, and/or weight distribution of the passenger 50 in the seat 16 and surrounding space in the ride vehicle 13. Further, the ride system 10 may be configured to, via the controller 32, actuate (e.g., translate) the first restraint 60 and/or the second restraint 62 based on detected presence and/or positioning of the passenger 50.

To facilitate proper actuation of the restraint assembly 18, the ride system 10 may be configured to, via the controller 32, receive a signal from the position sensor 78 indicative of a position (e.g., translational position) of the first restraint 60 and/or the second restraint 62. The controller 32 may then utilize the signal received from the position sensor 78 to determine the position of the first restraint 60 and/or the second restraint 62 for use in control of the restraint assembly 18. For example, the controller 32 may instruct the actuator 22 to translate the first restraint 60 from the released configuration 52 (e.g., first translational position) toward the second restraint 62 and into a secured configuration 56 (e.g., second translational position). As shown, in the secured configuration 56, the first restraint 60 is proximate to the at least one leg 54 of the passenger 50. In accordance with present embodiments, the restraint assembly 18 may be controlled to engage with passenger 50 prior to or only after inflation of associated inflatable bladders 28. For example, the actuator 22 may be controlled to stop the translation of the first restraint 60 in response to determining that the position of the first restraint 60 is breeching (e.g., exceeding) a threshold position (e.g., a threshold distance to a detected leg of the passenger). The threshold may be determined based on metrics associated with an inflated state of the inflatable bladders 28. For example, the threshold may operate to stop the first restraint 60 and/or the second restraint 62 within a few centimeters of a passenger leg to allow for initiation of engagement by inflation of the inflatable bladders 28.

In an embodiment, the ride system 10, via the controller 32, may be configured to control the pump 24 to inflate the one or more inflatable bladders 28 in response to the determined position of the first restraint 60 breeching the threshold position. The one or more inflatable bladders 28 may include a flexible membrane disposed about the one or more cavities 29, wherein the flexible membrane is configured to expand based on an influx of a fluid (e.g., air, water) into the one or more cavities 29. As shown, a first inflatable bladder 74 is configured to engage (e.g., contact, press against, etc.) a rear side 92 (e.g., second side) of the at least one leg 54 of the passenger 50 disposed between an ankle 94 of the at least one leg 54 and a knee 96 of the at least one leg 54. Additionally, a second inflatable bladder 72 is configured to engage the front side 68 (e.g., first side) of the at least one leg 54 when the first restraint 60 is in the secured configuration 56. In accordance with embodiments of the present disclosure, either the first inflatable bladder 74 or the second inflatable bladder 72 may be omitted. That is, a single inflatable bladder 28 may be used in conjunction with another component or surface of the restraint assembly 18 to secure the passenger 50 in the secured configuration 56.

In an embodiment, the controller 32 may be configured to receive a signal from the engagement sensor 80 indicative of a pressure of a fluid (e.g., air, water, etc.) disposed within the one or more cavities 29 of the one or more inflatable bladders 28. Specifically, the controller 32 may be configured to determine an estimated pressure of the fluid disposed within the one or more cavities 29 based on the received signal and control the pump 24 to inflate the one or more inflatable bladders 28 based on the estimated pressure. For example, controlling the pump 24 may include comparing the estimated pressure (e.g., measured pressure) to a threshold pressure, and operating the pump 24 to inflate the one or more inflatable bladders 28 in response to the estimated pressure falling below the threshold pressure. By inflating the one or more inflatable bladders 28 to a setpoint (e.g., predetermined, preset, etc.) pressure, the one or more inflatable bladders 28 may be configured to at least partially secure (e.g., restrain) the at least one leg 54 of the passenger 50. It should be noted that primary securement of the passenger 50 (e.g., the at least one leg 54) may be achieved by mechanical aspects of the restraint assembly 18 without the use of the inflatable bladders 28. However, the inflatable bladders 28 may operate to block the passenger 50 from moving within or slipping out of the restraint assembly 18. For example, other aspects of the restraint assembly 18 may directly engage the passenger 50 and then the inflatable bladders 28 may be inflated to expand into open spaces that prevent certain movement even within the restraint assembly 18 in the secured configuration 56.

In an embodiment, the restraint system 14 may include a combination of the embodiments described in FIGS. 2 and 3. For example, the first restraint 60 may be pivotably coupled to the ride vehicle 13 and the second restraint 62 may be translationally coupled to the ride vehicle 13. As another example, the first restraint 60 may be translationally coupled to the ride vehicle 13 and the second restraint 62 may be pivotably coupled to the ride vehicle 13. Additionally, it should be recognized that the restraint system 14 of FIGS. 2 and 3 may be configured to restrain one or more passengers 66 in the ride vehicle 13.

Figure 4:
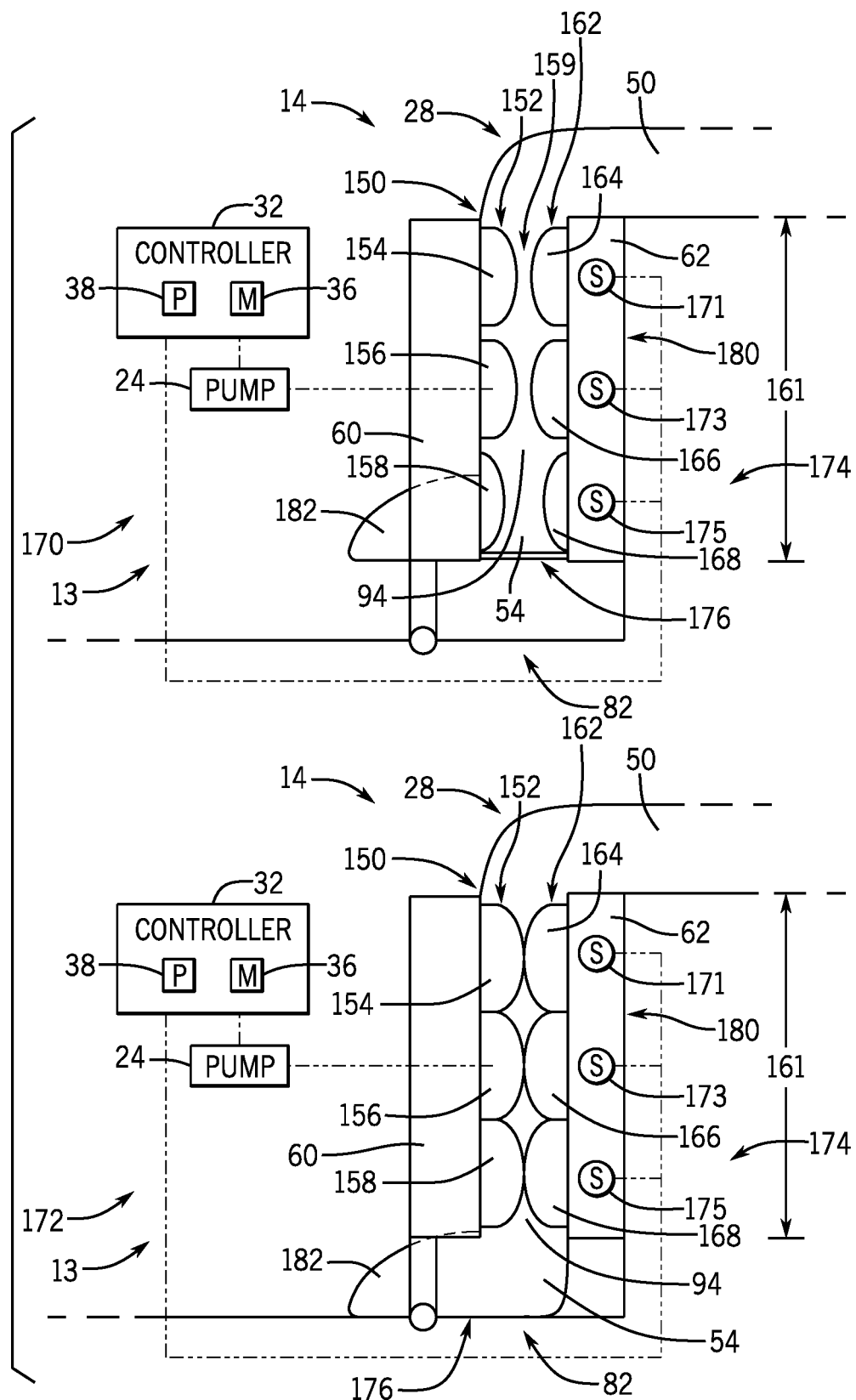
FIG. 4 is a series of side views of the restraint system of FIG. 3, employing a plurality of inflatable bladders, in accordance with an aspect of the present disclosure.

FIG. 4 includes two side views of the restraint system 14 of FIG. 3, employing the one or more inflatable bladders 28 in accordance with embodiments of the present disclosure. In an embodiment, the one or more inflatable bladders 28 includes a plurality of inflatable bladders 150. The first restraint 60 includes a first plurality of inflatable bladders 152 (e.g., inflatable bladders 154, 156, and 158) of the plurality of inflatable bladders 150 in a stacked arrangement configured to facilitate engagement at multiple points 159 along a length 161 of the at least one leg 54 of the passenger extending vertically relative to the bottom portion 82 (e.g., base) of the ride vehicle 13. The second restraint 62 includes a second plurality of inflatable bladders 162 (e.g., inflatable bladders 164, 166, and 168) in a stacked arrangement configured to facilitate engagement at multiple points 169 along the length 161 of the at least one leg 54 of the passenger extending vertically relative to the bottom portion 82 (e.g., base) of the ride vehicle 13.

In a first side view 170, the plurality of the inflatable bladders 150 are partially inflated to engage about the at least one leg 54 of the passenger 50. Specifically, in the embodiment illustrated by the first side view 170, upper inflatable bladders 154, 156, 164, 166 are inflated more than lower inflatable bladders 158, 168 because the lower inflatable bladders 158, 168 are accommodating a foot 182 of the passenger 50 that does not reach beyond an engagement area of the restraint assembly 18. Specifically, for example, the foot 182 does not reach to the bottom portion 82 (e.g., floor) of the ride vehicle 13 and interfaces with the lower inflatable bladders 158, 168. In contrast, in a second side view 172, the plurality of bladders 150 more fully engage with the at least one leg 54 because the foot 182 has passed through the engagement area and does not need to be substantially accommodated. In accordance with present embodiments, this flexibility of engagement provided by the restraint assembly 18 facilitates passenger comfort and allows for customization of a level of engagement for retaining the passenger within the restraint assembly 18.

In the illustrated embodiment, the ride system 10 includes a plurality of sensors 174 (e.g., sensors 171, 173, and 175). The plurality of sensors 174 may be disposed in various different locations. For example, the plurality of sensors 174 may be disposed in the first restraint 60, the second restraint 62 or each sensor of the plurality of sensors 174 may be positioned in a different location within the ride vehicle 13, within the restraint system 14, within the restraint assembly 18, and so forth. While three sensors are illustrated, the plurality of sensors 174 may include fewer or more sensors.

Indeed, each sensor 171, 173, and 175 may represent multiple sensors. The plurality of sensors 174 may include proximity sensors, depth cameras, photoelectric sensors, pressure sensors, resistance sensors, or the like. The plurality of sensors 174 may provide data indicative of location, engagement, inflation level (e.g., corresponding pressure level), and so forth, which may be utilized to confirm and/or detect proper alignment and engagement of the restraint assembly 18 with the passenger 50.

Specifically, for example, the plurality of sensors 174 may be configured to directly or indirectly detect contours of the at least one leg 54 of the passenger 50 and/or detect a conforming engagement of the one or more inflatable bladders 28 with the at least one leg 54, which may include the foot 182. Additionally, the plurality of sensors 174 may be configured to generate data indicative of the contours and/or the conforming engagement of the one or more inflatable bladders 28, which may be provided to the controller 32. Indeed, in the illustrated embodiment, the restraint system 14 includes the controller 32 communicatively coupled to the pump 24 and the plurality of sensors 174. Thus, the controller 32 may control inflation levels of the plurality of the inflatable bladders 150 by controlling the pump 24 based on information received from one or more sensor of the plurality of sensors 174.

In an embodiment, the controller 32 is configured to receive a signal from the plurality of sensors 174 indicative of a position (e.g., height) of a distal end portion 176 of the leg(s) 54 of the passenger 50. The controller 32 is configured to determine the position of the distal end portion 176 of the leg(s) 54 relative to the bottom portion 82 (e.g., base) of the ride vehicle 13 based on the received signal. The controller 32 is configured to control the pump 24 to selectively inflate the one or more inflatable bladders 28 based on the determined position. That is, the controller 32 is configured to inflate each inflatable bladder of a subset 180 of the one or more inflatable bladders 28 that are located above the distal end portion 176 relative to the bottom portion 82 (e.g., base) of the ride vehicle 13. In an embodiment, the distal end portion 176 may include the foot 182 of the passenger 50, the ankle 94, or the like. It may be appreciated that selectively inflating the subset 180 of the one or more inflatable bladders 28 located above the distal end portion 176 may enable the restraint system 14 to secure passengers 66 having legs 54 of varying lengths.

Inflatable Restraint System for a Passenger Support

Figure 5:
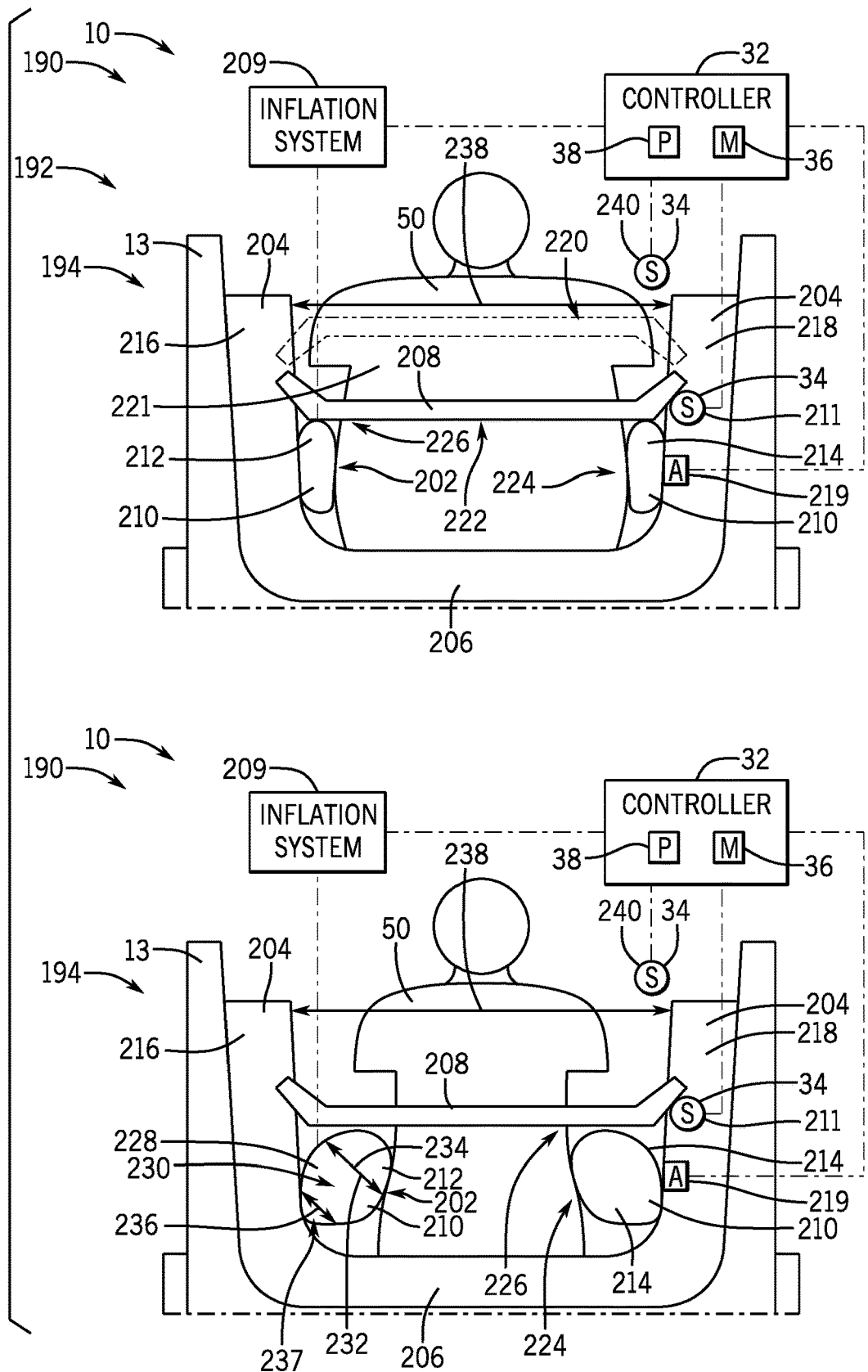
FIG. 5 is a series of front views of the ride system of FIG. 1, employing a restraint system that includes a bladder system of a lateral side portion of a passenger support of a ride vehicle, in accordance with an aspect of the present disclosure.

FIG. 5 includes two front views of the ride system 10 of FIG. 1, wherein the ride system 10 is employing a restraint system 190 in accordance with embodiments of the present disclosure. In a first front view 192, the restraint system 190 is depicted accommodating the passenger 50 having a body size that substantially occupies available space in the restraint system 190. In a second front view 194, the restraint system is depicted accommodating the passenger 50 having a body size that occupies a space substantially smaller than the available space in the restraint system 190, wherein the restraint system 190 provides adjustments for supplemental securement and stabilization. Indeed, the restraint system 190 is operable to employ an inflation system 209 to fill voids left by a primary restraint 208 and/or otherwise supplement engagement by the primary restraint 208 (e.g., engage body parts not engaged by the primary restraint 208, prevent movement within the primary restraint 208, block ingress or egress of body parts relative to an envelope of space defined by the primary restraint 208). The primary restraint 208 may include a lap bar, a seatbelt, and/or a shoulder harness.

In the illustrated embodiment, the restraint system 190 includes a bladder system 202 of one or more lateral side portions 204 of a passenger support 206 (e.g., seat) of a ride vehicle 13. As shown, the passenger support 206 is coupled to the ride vehicle 13. The restraint system 190 includes, the controller 32, a primary restraint 208 (e.g., a lap bar), an inflation system 209, and one or more sensor(s) 34 (one or more engagement sensors 211). The bladder system 202 includes one or more bladders 210 (e.g., bladders 212 and 214) of the one or more lateral side portions 204 (e.g., lateral side portions 216 and 218) of the passenger support 206. The ride system 10 also includes an actuator 219 configured to adjust a position of the plurality of bladders 210. In an embodiment, the one or more lateral side portions 204 of the passenger support 206 may be configured to extend around at least a portion of a torso 221 of the passenger 50 when the passenger 50 is properly secured in the passenger support 206.

The primary restraint 208 (e.g., a lap bar, seatbelt, shoulder restraint, overhead restraint) is configured to transition between an open configuration 220 (illustrated in dashed lines) and a secure configuration 222. The primary restraint 208 may include a traditional mechanical restraint that is operable to directly engage the passenger 50 or restrict movement of the passenger 50 (e.g., portions of the passenger's body) beyond a specific boundary or envelope (e.g., boundaries of a seating area for transporting the passenger 50). The open configuration 220 facilitates passenger access to the passenger support 206, which may be a seat, standing platform, recliner, or the like. The secure configuration 222 facilitates securement of the passenger 50 within the passenger support 206. For example, the primary restraint 208 may include a lap bar that, when in the secure configuration 222, blocks the passenger 50 from readily exiting the passenger support 206 but leaves room for movement of the passenger 50 within the passenger support 206.

In the illustrated embodiment, the passenger support 206 includes one or more lateral side portions 204 having the bladder system 202. The bladder system 202 includes the bladders 212 and 214 of the lateral side portions 216 and 218, respectively. As shown, the one or more bladders 210 are coupled to engage a hip region 224 of the passenger 50, a waist region 226 of the passenger 50, or a combination thereof when the passenger 50 is secured (e.g., situated in, settled in) the passenger support 206. While the illustrated embodiment depicts a seated support configuration, present embodiments include a standing support configuration, a prone support configuration, and other support configurations as well. The one or more bladders 210 include one or more interface layers 228 enclosing one or more cavities 230 (e.g., sacs) disposed within the one or more interface layers 228. As shown, the one or more interface layers 228 of the one or more bladders 210 are configured to expand based on an influx of a fluid into the one or more cavities 230. The one or more bladders 210 may have an asymmetrical shape (e.g., tear shape) when inflated. As shown, a first width dimension 232 of a top portion 234 of each bladder of the one or more bladders 210 is greater than a second width dimension 236 of a bottom portion 237 of each bladder of the one or more bladders 210. Embodiments with such proportions, may coordinate with typical body shapes (e.g., hip contours) to facilitate distributed engagement and surface contact for comfort and securement purposes.

In the illustrated embodiment, the controller 32 is communicatively coupled to the one or more engagement sensors 211 and the inflation system 209. In an embodiment, the inflation system 209 includes a pump configured to inflate the bladder system 202 (e.g., the one or more bladders 210). The one or more engagement sensors 211 are configured to detect a parameter (e.g., pressure) indicative of passenger engagement with the bladder system 202 and configured to provide data indicative of the parameter. For example, the one or more engagement sensors 211 may be configured to measure an internal pressure of a fluid disposed in the one or more cavities 230 of the one or more bladders 210. The inflation system 209 is configured to control inflation of the bladder system 202 based on the data provided by the one or more engagement sensors 211 to establish a level of engagement of the bladder system 202 (e.g., the one or more bladders 210) with the passenger 50. That is, the inflation system 209 may control inflation of the one or more bladders 210 such that the one or more bladders 210 physically contact the passenger 50. In an embodiment, the inflation system 209 is configured to control inflation of the bladder system 202 based on the data provided by the one or more engagement sensors 211 to establish a level of engagement of the bladder system 202 (e.g., the one or more bladders 210) with the passenger 50 in conjunction with the primary restraint 208 being in the secure configuration 222. In this way, the one or more bladders 210 may be controlled to supplement the primary restraint 208 to complete a desired level of movement restriction, which may include resisting movement within the primary restraint 208 and/or prevention of transition out of the primary restraint 208.

In an embodiment, the controller 32 is configured to control the inflation system 209 to control inflation of the bladder system 202 based on the data provided by the one or more engagement sensors 211. For example, the controller 32 may be configured to receive data from the one or more engagement sensors 211 indicative of an internal pressure of fluid in the one or more cavities 230 within the one or more interface layers 228 of the one or more bladders 210. The controller 32 may be configured to determine an estimated internal pressure of the fluid based on the received first data. Additionally, the controller 32 may be configured to control the inflation system 209 (e.g., the pump 24) to inflate the one or more first bladders 210 based on the estimated pressure. For example, the controller 32 may be configured to compare the estimated internal pressure with a threshold internal pressure. If the estimated internal pressure is less than the threshold internal pressure, the controller 32 may be configured to instruct the inflation system 209 (e.g., the pump 24) to continue inflating the one or more bladders 210. In response to the estimated internal pressure exceeding the threshold pressure, the controller 32 may be configured to stop operation of the inflation system 209 (e.g., the pump 24), thereby stopping inflation of the one or more bladders 210. It may be recognized that by controlling the internal pressure of the one or more cavities 230 of the one or more bladders 210, the controller 32 may be configured to control a level of engagement (e.g., pressure) applied to the passenger 50. In other embodiments, other parameters may be employed to control the inflation level of the one or more bladders 210, including optical data, capacitive touch data, mechanical switch feedback, push button feedback, and so forth.

It should be recognized that by using a passenger support 206 configured with the bladder system 202, the passenger support 206 may enable passengers 66 of varying sizes (e.g., small passengers, large passengers, etc.) to be secured within the passenger support 206 via the bladder system 202 conforming to the passenger 50. For example, a spacing 238 between the lateral side portions 216 and 218 may be large enough to accommodate a passenger 50 of a large body size. When a passenger of a small body size is utilizing the same spacing 238, it may be desirable to supplement with engagement by the bladder system 202. Indeed, even for larger body types, it can be beneficial to increase engagement with the bladder system 202 to resist undesired movement (e.g., shifting during a ride).

The restraint system 190 may include one or more sensors 240 configured to detect a presence of a passenger 50 (e.g., a seated passenger) situated in the passenger support 206 and provide data indicative of the presence of the passenger 50 situated in the passenger support 206. For example, the one or more sensors 240 may include a weight and/or mass sensor configured to measure parameters indicating that the passenger 50 is situated (e.g., seated) in the passenger support 206. Further, the controller 32 may be configured to receive data from the one or more sensors 240 and to determine the passenger 50 to be situated (e.g., settled) in the passenger support 206 based on the received data. Additionally, the controller 32 may be configured to control the inflation system 209 (e.g., the pump 24) to inflate the bladder system 202 (e.g. the one or more bladders 210) based on determining that the passenger 50 is properly situated in the passenger support 206. The one or more bladders 210 may be shaped and positioned to engage with contours of a human body that are aligned with the one or more bladders 210 when the passenger is properly positioned (e.g., seated). Additionally, the one or more bladders 210 may be shaped and positioned to engage with or be positioned adjacent the primary restraint 208 to encourage retention of the passenger 50 within a certain envelope of space.

In an embodiment, an example process may include engaging the primary restraint 208 of the restraint system 190 of the ride vehicle 13 about the passenger 50 positioned on the passenger support 206 of the ride vehicle 13. The example process may additionally include receiving, via the processor 38, data from the one or more engagement sensors 211 indicative of an internal pressure of a fluid in the one or more cavities 230 of the one or more bladders 210 of the restraint system 190. The example process may additionally include determining, via the processor 38, an estimated internal pressure based on the received data. The example process may additionally include controlling, via the processor 38, the pump 24 to inflate at least one of the one or more bladders 210 which are coupled or integrated with the passenger support 206 based on the estimated pressure, such that the at least one of the one or more bladders 210 expand into space not occupied by the primary restraint 208.

Figure 6:
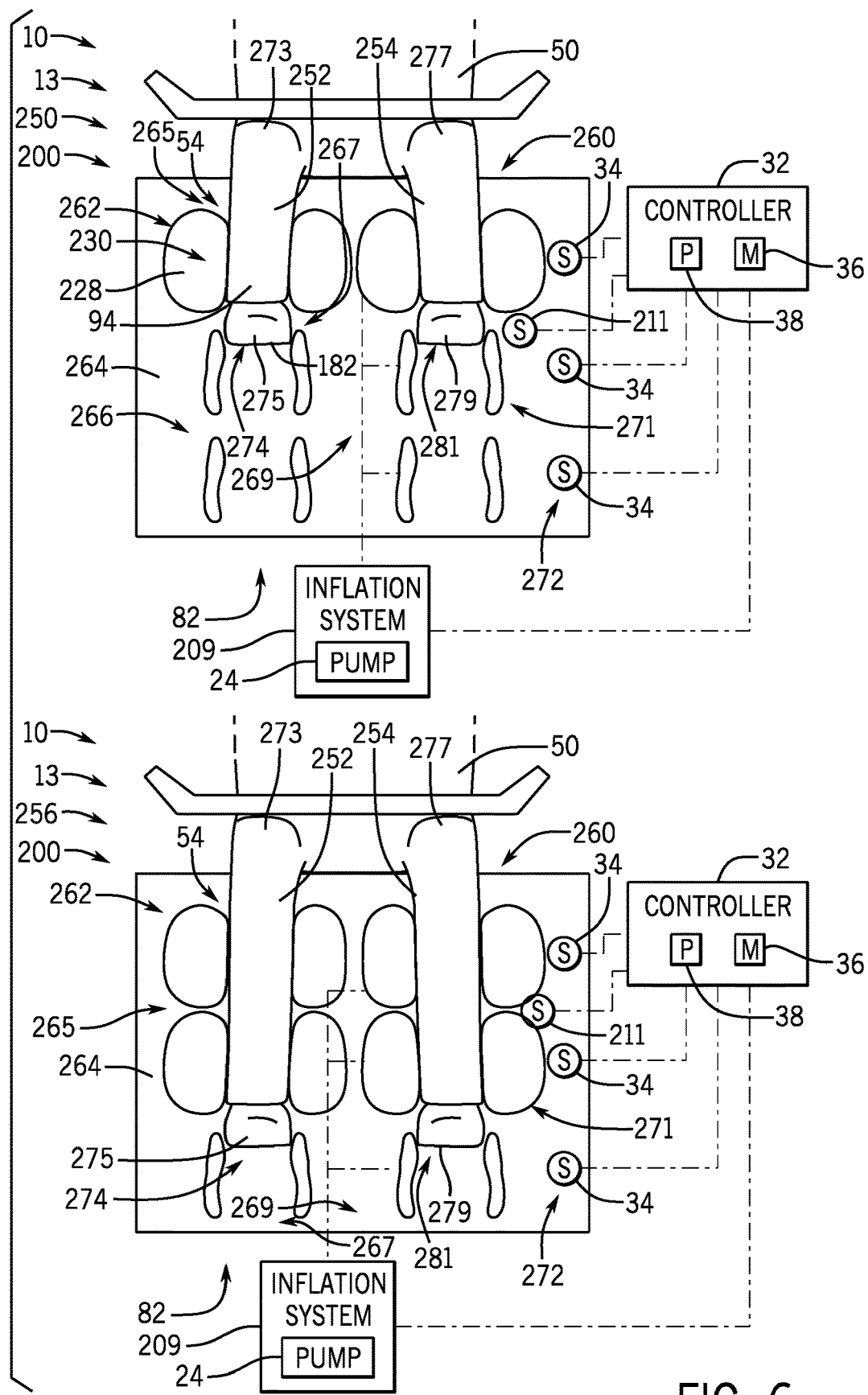
FIG. 6 is a series of front views of the ride system of FIG. 1, employing a restraint system that includes a bladder system of a bottom portion of a passenger support of a ride vehicle, in accordance with an aspect of the present disclosure.

FIG. 6 is a series of two front views of the ride system 10 of FIG. 1, employing the restraint system 190, in accordance with embodiments of the present disclosure. A first front view 250 represents engagement of the restraint system 190 with legs 252 and 254 that are shorter than the legs 252 and 254 that are depicted in the second front view 256. In each of the front views 250 and 256, the restraint system 190 includes a plurality of bladders 260 (e.g., leg engagement bladders), which are part of a lower bladder system 262 of a bottom portion 264 of the passenger support 206. In the illustrated embodiment, the plurality of bladders 260 are disposed on sides 266 (e.g., lateral sides) of where the legs 54 (e.g., legs 252 and 254) of the passenger 50 are intended to be positioned. In the illustrated embodiment, the sides 266 include sides 265 and 267 along the leg 252, and sides 269 and 271 along the leg 254. The sides 265 and 267 are disposed between a knee 273 and an ankle 275 of the leg 252, and the sides 269 and 271 are disposed between a knee 277 and an ankle 279 of the leg 254. The restraint system 190 also includes the inflation system 209 configured to inflate the plurality of bladders 260. The restraint system 190 also includes one or more position sensors 272 (e.g., one or more sensors 34) configured to determine a position of a distal end portion 274 of the leg 252 of the passenger 50 and/or a distal end portion 281 of the leg 254 of the passenger 50 relative to the bottom portion 82 (e.g., base) of the ride vehicle 13, and generate data indicative of the position of the distal end portion of the at least one leg 54 of the passenger 50 relative to the bottom portion 82 of the ride vehicle 13.

In an embodiment, the inflation system 209 includes the pump 24 configured to inflate the second bladder system 262 (e.g., the plurality of bladders 260). The restraint system 190 also includes the one or more engagement sensors 211, which are configured to detect a parameter (e.g., pressure) indicative of passenger engagement with the second bladder system 262 and configured to provide data indicative of the parameter. For example, the one or more engagement sensors 211 may be analogous to the engagement sensor 80 described in FIGS. 2 and 3, such that the one or more engagement sensors 211 may be configured to measure an internal pressure of a fluid disposed in one or more cavities 230 within one or more interface layers 228 of the plurality of bladders 260. In the illustrated embodiment, the restraint system 190 also includes the controller 32, which is communicatively coupled to the inflation system 209, the one or more engagement sensors 211, and the one or more position sensors 272.

In an embodiment, the controller 32 is configured to control the inflation system 209 to control inflation of the bladder system 262 based on the data provided by the one or more engagement sensors 211. For example, the controller 32 may be configured to receive data from the one or more engagement sensors 211 indicative of an internal pressure of fluid in the one or more cavities 230 within the one or more interface layers 228 of the plurality of bladders 260. The controller 32 may be configured to determine an estimated internal pressure of the fluid based on the received first data. Additionally, the controller 32 may be configured to control the inflation system 209 (e.g., the pump 24) to inflate the plurality of bladders 260 based on the estimated pressure. For example, the controller 32 may be configured to compare the estimated internal pressure with a threshold internal pressure. If the estimated internal pressure is less than the threshold internal pressure, the controller 32 may be configured to instruct the inflation system 209 (e.g., the pump 24) to continue inflating the plurality of bladders 260. In response to the estimated internal pressure exceeding the threshold pressure, the controller 32 may be configured to stop operation of the inflation system 209 (e.g., the pump 24), thereby stopping inflation of the plurality of bladders 260. It may be recognized that by controlling the internal pressure of the one or more cavities 230 of the one or more bladders 210, the controller 32 may be configured to control a level of engagement (e.g., pressure) applied to the passenger 50 by the plurality of bladders 260.

In an embodiment, the controller 32 is configured to receive a signal from the one or more position sensors 272 indicative of a position (e.g., height) of the distal end portions 274 and 281 of the leg(s) 54 of the passenger 50. The controller 32 is configured to determine the position of the distal end portion 274 and/or the position of the distal end portion 281 relative to the bottom portion 82 of the ride vehicle 13 based on the received signal. The controller 32 is configured to control the pump 24 to selectively inflate a subset 282 of the plurality of bladders 260 based on the determined position. That is, the controller 32 is configured to inflate the subset 282 of the plurality of bladders 260 that is located above the distal end portion 274 and/or the distal end portion 281 relative to the bottom portion 82 (e.g., base) of the ride vehicle 13. In an embodiment, the distal end portion 274 and/or the distal end portion 281 may include a foot 182 of the passenger 50, the ankle 94, or the like. It may be appreciated that selectively inflating the subset 282 of the plurality of bladders 260 located above the distal end portion 274 and/or adjacent the distal end portion 281 may enable the restraint system 190 to secure passengers 66 having legs 54 of varying lengths.

In an embodiment, a combination of the above embodiments may be used in the ride system 10. More specifically, the ride system 10 may include a combination of the restraint system 14 and the restraint system 190. For example, the ride system 10 may include the restraints 30 of the restraint system 14 as well as the bladder system 202 of the restraint system 190. It may be recognized that some embodiments may include a portion of the restraint system 14, a portion of the restraint system 190, or a combination thereof. Furthermore, it may be recognized that the restraint system 14 and the restraint system 190 may share one or more components, such as the controller 32, one or more sensors 34, and/or a common inflation system.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It may be appreciated that features shown and described with reference to FIGS. 1-6 may be combined in any suitable manner. For example, the embodiments of restraint system 14 shown in FIGS. 1-4 may be utilized with the restraint system 190 shown in FIGS. 5 and 6.

Technical effects of the primary restraint systems and related techniques disclosed herein include securing passengers of varying sizes. For example, a ride vehicle having inflatable leg restraints may be able to accommodate a first passenger having short and thin legs as well as a second passenger having long and stocky legs. Additionally, the restraint systems disclosed herein allow for passengers of varying sizes to ride in a common ride vehicle. For example, the restraint system may include one or more inflatable bladders coupled to lateral sides of a passenger support (e.g., seat). The restraint system may be configured to regulate a level of engagement of the one or more inflatable bladders with the passenger via an inflation of the one or more inflatable bladders to a threshold pressure, thereby enabling securement of both small passengers and large passengers in the passenger support.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A restraint system for a ride vehicle, comprising:
a clamp restraint comprising a first restraint portion and a second restraint portion, wherein the clamp restraint is configured to transition between a released configuration and a secured configuration, wherein the clamp restraint is configured to receive at least one passenger leg between the first restraint portion and the second restraint portion in the released configuration; and one or more inflatable bladders of the first restraint portion, the second restraint portion, or both configured to inflate to engage the at least one passenger leg in the secured configuration to facilitate restraint of the passenger within the ride vehicle;

wherein a first distance between the first restraint portion to the second restraint portion when the clamp restraint is in the released configuration is greater than a second distance between the first restraint portion and the second restraint portion when the clamp restraint is in the secured configuration.

2. The restraint system of claim 1, wherein the first restraint portion comprises an arm pivotably coupled to the ride vehicle.

3. The restraint system of claim 2, wherein the arm is configured to rotate from a first angular position into a second angular position toward the second restraint portion, the restraint system comprising a pump configured to inflate the one or more inflatable bladders in response to the arm reaching the second angular position.

4. The restraint system of claim 1, wherein the first restraint portion comprises a plank configured to translate across a bottom portion of the ride vehicle toward the second restraint portion.

5. The restraint system of claim 4, wherein the plank is configured to translate from a first position into a second position toward the second restraint portion, and wherein the restraint system comprises a pump configured to inflate the one or more inflatable bladders in response to the plank reaching the second position.

6. The restraint system of claim 4, wherein the first restraint portion is configured to engage a front side of the at least one passenger leg disposed between a knee and an ankle of the leg, wherein the second restraint portion is configured to engage a back side of the at least one passenger leg disposed between the knee and the ankle.

7. The restraint system of claim 1, wherein the one or more inflatable bladders comprises a plurality of bladders in a stacked arrangement that facilitates engagement at multiple points along a length of the leg extending vertically relative to a base of the ride vehicle.

8. The restraint system of claim 1, wherein the one or more inflatable bladders comprises a plurality of inflatable bladders, the restraint system comprising sensors configured to detect contours of the at least one passenger leg and/or conforming engagement of at least one bladder of the plurality of inflatable bladders with the at least one passenger leg and generate data indicative of the contours and/or the conforming engagement.

9. The restraint system of claim 8, comprising a controller configured to control a pump to selectively inflate all or a subset of the plurality of inflatable bladders based on the data.

10. A restraint system for a ride vehicle, the restraint system comprising:
a passenger support coupled to the ride vehicle;
a restraint configured to transition between an open configuration that facilitates passenger access to the passenger support and a secure configuration that facilitates securement of the passenger within the passenger support;
a lateral side portion of the passenger support comprising a bladder system;
one or more sensors configured to detect a parameter indicative of passenger engagement with the bladder system and configured to provide data indicative of the parameter; and
an inflation system configured to control inflation of the bladder system based on the data to establish a level of engagement of the bladder system with the passenger in conjunction with the restraint being in the secure configuration.

11. The restraint system of claim 10, wherein the restraint comprises a lap bar, a seatbelt, and/or a shoulder harness.

12. The restraint system of claim 10, wherein the bladder system comprises one or more bladders configured to engage a hip region, a waist region, or a combination thereof of the passenger properly positioned in the passenger support.

13. The restraint system of claim 12, wherein a first width dimension of a top portion of each bladder of the one or more bladders is greater than a second width dimension of a bottom portion of each bladder of the one or more bladders when the one or more bladders are inflated.

14. The restraint system of claim 12, wherein the one or more bladders comprise an interface layer enclosing one or more cavities, the interface layer configured to expand based on an influx of a fluid into one or more cavities.

15. The restraint system of claim 10, wherein the passenger support comprises a bottom portion having an additional bladder system that includes a plurality of additional bladders configured to engage first and second sides of a leg of the passenger between a knee and an ankle of the leg.

16. The restraint system of claim 15, comprising one or more additional sensors configured to determine a position of a distal end portion of at least one leg of the passenger relative to a base of the ride vehicle and generate positional data indicative of the position of the distal end portion of the at least one leg of the passenger relative to the base of the ride vehicle.

17. The restraint system of claim 16, comprising a controller configured to:
receive the positional data from the one or more additional sensors;
determine an estimated position of the distal end portion relative to the base of the ride vehicle based on the positional data; and
control the inflation system to selectively inflate a subset of the plurality of additional bladders located above the estimated position relative to the base of the ride vehicle.

18. The restraint system of claim 10, wherein the lateral side portion of the passenger support comprises a first lateral side portion, the restraint system comprising:
a second lateral side portion of the passenger support positioned opposite the first lateral side portion and comprising an additional bladder system, wherein the inflation system is configured to control inflation of the additional bladder system based on the data.

19. A method, comprising:
receiving, via a processor, a first signal from a first sensor indicative of a location of a distal end portion of a passenger leg relative to a bottom side of a ride vehicle;
determining, via the processor, an estimated location of the distal end portion of the leg based on the received first signal; and controlling, via the processor, a compressor to selectively inflate at least one bladder of a plurality of bladders based on the estimated location;

wherein the at least one bladder is disposed above the estimated location relative to the bottom side.

20. The method of claim 19, comprising:

receiving, via the processor, a second signal from a second sensor indicative of a pressure of a fluid in one or more cavities of the plurality of bladders;

determining, via the processor, an estimated pressure based on the received second signal; and controlling, via the processor, the compressor to inflate the at least one bladder of the plurality of bladders based on the estimated pressure.

\* \* \* \* \*